Patented Feb. 26, 1952

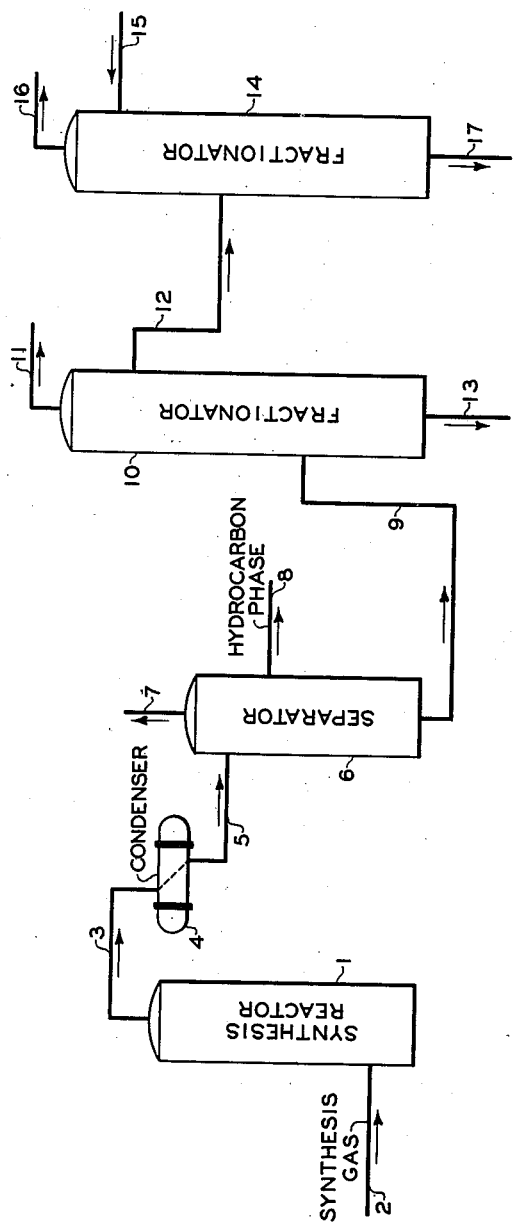

2,586,929

UNITED STATES PATENT OFFICE 2,586,929

SEPARATION OF OXYGENATED ORGANIC COMPOUNDS

Harold W. Fleming, Bartlesville, and John S. Cromeans, Dewey, Okla., assignors to Phillips Petroleum Company, a corporation of Delaware Application April 18, 1949, Serial No. 88,092

3 Claims. (Cl. 260—488)

This invention relates to a method for resolving a mixture of difficultly separable oxygenated organic compounds that are not readily resolved by ordinary fractionation means. In one embodiment, this invention relates to a method for resolving difficultly separable oxygenated organic compounds resulting from the catalytic hydrogenation of an oxide of carbon. In a specific aspect this invention relates to the separation of methyl propyl ketone from a mixture of oxygenated organic compounds containing, in addition to methyl propyl ketone, ethyl alcohol and water.

In the catalytic hydrogenation of a carbon oxide, a product comprising hydrocarbons and oxygen-containing hydrocarbon derivatives is obtained in relative yields dependent upon the choice of catalyst and of hydrogenation conditions. For example, hydrogen and carbon monoxide may be passed into a catalytic zone containing an iron catalyst suitable for the production of hydrocarbons as the principal reaction product. During the reaction minor amounts of oxygen-containing compounds, water and carbon dioxide are also formed. The oxygen-containing compounds are valuable products of the hydrogenation reaction, but in numerous instances it is difficult to resolve fractions of the oxygenated products boiling within a relatively narrow range into the respective components of the fraction because of the close proximity of the boiling points of the components or because of the tendency of the components to form close-boiling azeotropes. A particularly difficult fraction to resolve contains ethyl alcohol, methyl-n-propyl ketone and water. From this mixture of compounds the following close-boiling azeotropes are formed which are not separable by ordinary fractionation:

novel method for resolving difficultly separable organic compounds not readily separable by ordinary fractionation.

It is another object of this invention to provide a novel method for resolving difficultly separable oxygenated compounds resulting from the catalytic hydrogenation of a carbon oxide.

It is a further object of this invention to provide a novel method for resolving a mixture of ethyl alcohol, methyl-n-propyl ketone and water.

Further and additional objects will be readily apparent from the disclosure hereinbelow.

We have found that mixtures of ethyl alcohol, methyl-n-propyl ketone and water can be resolved by adding either formic acid or acetic acid or a mixture of the two acids to the mixture to be resolved to convert at least part of the ethyl alcohol to the corresponding ethyl ester and then separating ethyl ester and any unconverted ethyl alcohol from the resulting mixture by any suitable method such as fractionation.

The esterification reaction is preferably effected in the presence of a small amount or trace of a mineral acid, such as sulfuric acid, hydrochloric acid and the like, to catalyze the reaction. The concentration of the mineral acid should be within the range of 0.01 to 10 liquid volume per cent of the total mixture. We prefer to use the smallest amount that will catalyze the esterification reaction. For example, four drops of concentrated sulfuric acid in 200 milliliters of the mixture to be resolved is sufficient to catalyze the reaction.

Our invention to separate methyl-n-propyl ketone from a mixture containing said ketone, ethyl alcohol and water is thus effected by introducing an amount of formic acid or acetic

| Component | Weight Per Cent | Component | Weight Per Cent | Component | Weight Per Cent | Boiling Point, °C. |
|---|---|---|---|---|---|---|
| Ethyl Alcohol | 95.57 | Water | 4.43 | | | 78.15 |
| Do | 71.7 | do | 9.1 | Methyl-n-propyl ketone | 19.2 | 77.4 |

It is known in the art that methyl-n-propyl ketone can be separated from ethyl alcohol and water by adding phenylhydrazine to the mixture to react with the ketone. Also by solvent extraction methods the ketone can be extracted from the mixture, using a solvent such as dodecane. Both of these methods require numerous processing steps, and, as a consequence, their use is expensive and uneconomical.

It is an object of this invention to provide a acid or a mixture thereof to the mixture to be resolved in a quantity sufficient to esterify at least part of the ethyl alcohol to the corresponding ester. An amount of a mineral acid sufficient to catalyze the esterification reaction is introduced, and the ester is then removed by any suitable means in the form of either the ester alone or an azeotrope of the ester, ethyl alcohol and water. A suitable method for removing the ester is by distillation, and the ketone is then concentrated in the kettle bottoms from which it may be separated by conventional means.

When formic acid is used in our process the ethyl alcohol is converted to ethyl formate which does not form an azeotrope with any of the components of the resulting mixture. If the ethyl formate, which boils at 54.1° C., is removed by distillation, it is taken overhead and the ketone is concentrated in the kettle. When acetic acid is used in our process the ethyl alcohol is converted to ethyl acetate which forms an azeotrope with ethyl alcohol and water. This latter azeotrope contains 83.2 weight per cent ethyl acetate, 9 weight per cent ethyl alcohol and 7.8 weight per cent water and boils at 70.3° C. If the ethyl acetate is removed by distillation, it is taken overhead in the form of the azeotrope, and the ketone remains in the kettle. When a mixture of formic acid and acetic acid is used to esterify the ethyl alcohol, the alcohol is converted to corresponding formate and acetate. These esters are readily removable from the resulting mixture by distillation with the formate being removed as such and with the acetate being removed as an azeotrope with ethyl alcohol and water.

To effect our process we prefer to use no more esterifying acid than that amount required to react with the ethyl alcohol, i. e., no more than a stoichiometric equivalent of the alcohol. When formic acid is the esterifying acid, it should be used in a quantity sufficient to react with all the ethyl alcohol. When acetic acid is the esterifying acid, it may be used in a quantity sufficient to form no more ethyl acetate than that required to form the ethyl acetate-ethyl alcohol-water azeotrope. Alternatively, sufficient acetic acid may be used to convert all the ethyl alcohol to ethyl acetate. The ethyl acetate and water then form an azeotrope containing 91.8 weight per cent ethyl acetate and boiling at 70.04° C. This azeotrope is readily separable by distillation from an azeotrope of methyl-n-propyl ketone and water which contains 86.5 weight per cent of the ketone and boils at 82.9° C.

In the esterification reaction, esterifying acid in excess of that stoichiometrically equivalent to the ethyl alcohol may be used, but then it is necessary to separate the acid from the aqueous kettle product containing the ketone after the ester has been removed overhead. If esterifying acid less than that stoichiometrically equivalent to the ethyl alcohol is used, any unconverted ethyl alcohol may be removed overhead by distillation and, if desired, recycled to the esterification zone.

Our process is readily adaptable to either continuous or batch operation. In a continuous operation the mixture to be resolved may be introduced continuously to a fractionating column at a point near the center or intermediate the center and bottom of the column. The esterifying acid is then introduced continuously to the column at a point above the point of introduction of said mixture or near the top of the column. The mineral acid may be added to the column with the mixture to be resolved or at any other suitable point. The ethyl ester is then removed overhead either alone or in an azeotrope and the methyl-n-propyl ketone is concentrated in an aqueous solution in the kettle. In a batch operation the mixture to be resolved and the esterifying and catalyzing acids are intermixed in a reaction zone, and the resulting mixture is distilled to obtain the ester overhead and the ketone in the kettle.

The figure is a schematic flow diagram of one method for effecting our process. Such conventional equipment as compressors, pumps, valves, etc., have not been included to simplify the drawing, but their inclusion and use in the process would be readily apparent to one skilled in the art. Synthesis gas comprising carbon monoxide and hydrogen in a molar ratio within the range of 1:1 to 1:3, preferably 1:2, is introduced to synthesis reactor 1 via line 2. The reaction conditions and catalysts suitable for effecting the reaction in reactor 1 are well known to those skilled in the hydrocarbon synthesis art, and it is also known that the reaction product is dependent upon the type of catalyst, the catalyst composition and the reaction conditions. Effluent from reactor 1 containing unconverted reactants, water, carbon dioxide, hydrocarbons and oxygenated hydrocarbon derivatives passes via line 3, condenser 4 and line 5 to separator 6. In separator 6 the normally liquid reaction products separate into a hydrocarbon phase and an aqueous phase, and the gaseous reaction products are removed from the separator via line 7. These latter products may be removed from the system or they may be recycled to reactor 1 or they may pass to a synthesis gas producer (not shown). The hydrocarbon phase is withdrawn from separator 6 via line 8 and, if desired, subjected to further treatment. The aqueous phase which contains the major portion of the oxygenated reaction products passes via line 9 to fractionator 10 where the aqueous phase is topped at a temperature not above 77° C. and within the range of 70 to 77° C. After the topping operation the resulting product, when a reduced iron oxide synthesis catalyst is used, may contain sufficient acetic acid that it is possible to effect our process at this point merely by adding a mineral acid to fractionator 10 and then distilling the resulting mixture, as disclosed hereinbelow in Example 2. Instead of operating in this manner, we prefer to top the aqueous phase in fractionator 10 at a temperature not above 77° C., and the lower boiling reaction products are removed via line 11. A fraction is removed from the aqueous phase near the top of fractionator 10, via line 12. This fraction boils slightly higher than the fraction removed via line 11 and preferably within the range of 75 to 79° C. The reaction products in the aqueous phase boiling above 79° C. are removed from the system via line 13 for further processing, if desired. The fraction removed via line 12 contains a mixture of ethyl alcohol, methyl-n-propyl ketone and water. Via line 12 it passes to fractionator 14 into which formic acid and sulfuric acid are introduced via line 15. The ethyl alcohol is converted to ethyl formate which is removed overhead via line 16, and methyl-n-propyl ketone and water are removed as kettle product via line 17.

The following examples are illustrative of our invention:

*Example I*

To a mixture consisting of 192 grams of methyl-n-propyl ketone, 717 grams of ethyl alcohol and 91 grams of water is added 567 grams of acetic acid and a trace of sulfuric acid. The resulting mixture is distilled at 70.3° C., and an azeotrope consisting of 832 grams of ethyl acetate, 78 grams of water and 90 grams of ethyl alcohol is recovered overhead leaving a mixture of methyl-n-propyl ketone, water and about 200 grams of ethyl alcohol in the kettle. The excess ethyl alcohol is removed overhead by fractionation as an azeotrope with the ketone and water leaving about 130 grams of ketone in the kettle with water from which the ketone separates as an upper phase. The azeotrope containing the ketone, alcohol and water is recycled to the esterification step.

Example II

To a 25 mm. by 36 inch Hypercal column was charged 9920 ml. of Fischer-Tropsch aqueous product. This was topped to 77° C. with the usual oxygenated chemicals being recovered overhead in azeotropic mixtures. The usual oxygenated chemicals recovered were acetaldehyde, propionaldehyde, methanol, acetone, butyraldehyde, methyl ethyl ketone, ethanol and water with traces of methyl and ethyl acetate. At this point the column was shut down and fifty ml. of twenty per cent concentrated sulfuric acid was added to the kettle contents and the column was brought to total reflux for four hours. An ethyl acetate, ethanol and water azeotrope was then recovered overhead at about 70.3° C. and a reflux ratio of 120/1 thus concentrating methyl-n-propyl ketone in the kettle product. In order to remove about 95 per cent of the acetic acid present as ethyl acetate it was necessary to reduce the reflux ratio because of the great concentration of water in the kettle. After recovery of ethyl acetate azeotrope the fractionation was continued to yield an azeotropic mixture consisting of ethanol, water, ethyl propionate and methyl-n-propyl ketone. Following this a small amount of ethanol and water azeotrope was recovered. Thereafter the following azeotropes were recovered in order; n-propanol and water, n-butanol and water, and lastly butyric acid and water.

As a product of our process is obtained either an ester, such as ethyl formate or ethyl acetate, or an ester-alcohol mixture, such as an ethyl acetate-ethyl alcohol mixture, and this product may be readily resolved to recover the original reactants in any suitable manner. For example, the ester or ester-alcohol mixture may be saponified with an alkali metal hydroxide and the resulting mixture distilled to recover the alcohol contained therein. The resulting acid salt may then be treated with a mineral acid, such as sulfuric acid or hydrochloric acid, and the resulting mixture distilled to recover the organic acid therein.

Throughout our disclosure we have discussed the resolution of a mixture of methyl-n-propyl ketone, ethyl alcohol and water as obtained in a fraction from the aqueous phase of the reaction product from carbon monoxide hydrogenation. Our process applies chiefly to the aqueous phase produced when using a reduced iron oxide as the hydrocarbon synthesis catalyst, since other catalysts, such as cobalt-containing catalysts, produce only very limited amounts of oxygenated organic compounds, but the method of producing the mixture is not intended to be a limitation upon our invention. Similarly, our invention, as described hereinabove, is susceptible to wide modification by those skilled in the art without departing from the scope of our invention.

We claim:

1. The method of resolving the normally liquid reaction products obtained from the hydrogenation of a carbon oxide, which comprises separating said reaction products into a hydrocarbon phase and an aqueous phase, removing from said aqueous phase reaction products having a boiling point no higher than 77° C., distilling from the reaction products boiling above 77° C. an azeotrope consisting essentially of methyl-n-propyl ketone, ethyl alcohol and water, reacting ethyl alcohol in said azeotrope with no more than the stoichiometric equivalent of an organic acid selected from the group consisting of formic acid and acetic acid, and recovering from the resulting mixture by distillation (a) a different, lower-boiling fraction containing thus-formed ester and (b) a higher-boiling fraction enriched in methyl-n-propyl ketone.

2. The method of separating methyl-n-propyl ketone from an aqueous mixture containing it, ethyl alcohol and other organic compounds which comprises separating from said mixture by fractional distillation a ternary azeotrope consisting essentially of methyl-n-propyl ketone, ethyl alcohol and water, then reacting with acetic acid only that portion of the ethyl alcohol present in said azeotrope to produce in the resulting reaction mixture ethyl acetate plus unreacted ethyl alcohol in those relative quantities required to form the lower-boiling ethyl acetate-ethyl alcohol-water azeotrope, and recovering from said reaction mixture by distillation (a) said lower-boiling ethyl acetate-ethyl alcohol-water azeotrope and (b) a higher-boiling fraction containing methyl-n-propyl ketone and free from ethyl alcohol.

3. The method of separating methyl-n-propyl ketone from an aqueous mixture containing it, ethyl alcohol and other organic compounds, which comprises separating from said mixture by fractional distillation an azeotrope consisting essentially of methyl-n-propyl ketone, ethyl alcohol and water, then reacting ethyl alcohol in said mixture with no more than the stoichiometric equivalent of an organic acid selected from the group consisting of formic acid and acetic acid, and recovering from the resulting mixture by distillation (a) a different, lower-boiling fraction containing thus-formed ester and (b) a higher-boiling fraction enriched in methyl-n-propyl ketone.

HAROLD W. FLEMING.
JOHN S. CROMEANS.

REFERENCES CITED

The following references are of record in the file of this patent:

UNITED STATES PATENTS

| Number | Name | Date |
| --- | --- | --- |
| 1,365,051 | Ellis | Jan. 11, 1921 |
| 1,869,837 | Ayres | Aug. 2, 1932 |
| 1,939,116 | Fuchs | Dec. 12, 1933 |
| 1,993,552 | Izard | Mar. 5, 1935 |
| 2,052,881 | Klipstein | Sept. 1, 1936 |
| 2,208,808 | Fischer | July 23, 1940 |
| 2,265,948 | Loder | Dec. 9, 1941 |

OTHER REFERENCES

Feldman, Chem. Abst., 30, Col. 7538 (1936).